United States Patent [19]

Kolpak

[11] Patent Number: 5,353,646
[45] Date of Patent: Oct. 11, 1994

[54] MULTIPHASE FLUID FLOW MEASUREMENT

[75] Inventor: Miroslav M. Kolpak, Plano, Tex.

[73] Assignee: Atlantic Richfield Company, Los Angeles, Calif.

[21] Appl. No.: 179,411

[22] Filed: Jan. 10, 1994

[51] Int. Cl.$^5$ .............................. G01F 1/68
[52] U.S. Cl. .............................. 73/861.04
[58] Field of Search .............................. 73/861, 861.04

[56] References Cited

U.S. PATENT DOCUMENTS

| | | | |
|---|---|---|---|
| 4,056,002 | 11/1977 | Arieh et al. | 73/861.04 |
| 4,272,982 | 6/1981 | Arnold et al. | 73/861.04 |
| 4,821,580 | 4/1989 | Jorritsma | 73/861 |

*Primary Examiner*—Herbert Goldstein
*Attorney, Agent, or Firm*—Michael E. Martin

[57] ABSTRACT

The liquid and gas volumetric flow rates of a multiphase fluid mixture are measured by pumping the fluid mixture with a positive displacement pump such as a multihelical lobed rotor type pump, measuring the pressure differential, temperature differential and power input to the pump and calculating the liquid volumetric flow rate and gas volumetric flow rate based on the measured parameters, pump coefficients for friction horse power, fluid leakage and heat transfer, together with predetermined values of liquid and gas specific heat, density and polytropic compression exponent. Approximate flow rates of gas and liquid may be determined by monitoring the pump power input and fluid pressure and temperature changes across the pump with sufficient accuracy for applications such as in pumping crude oil and natural gas mixtures from production wells.

3 Claims, 1 Drawing Sheet

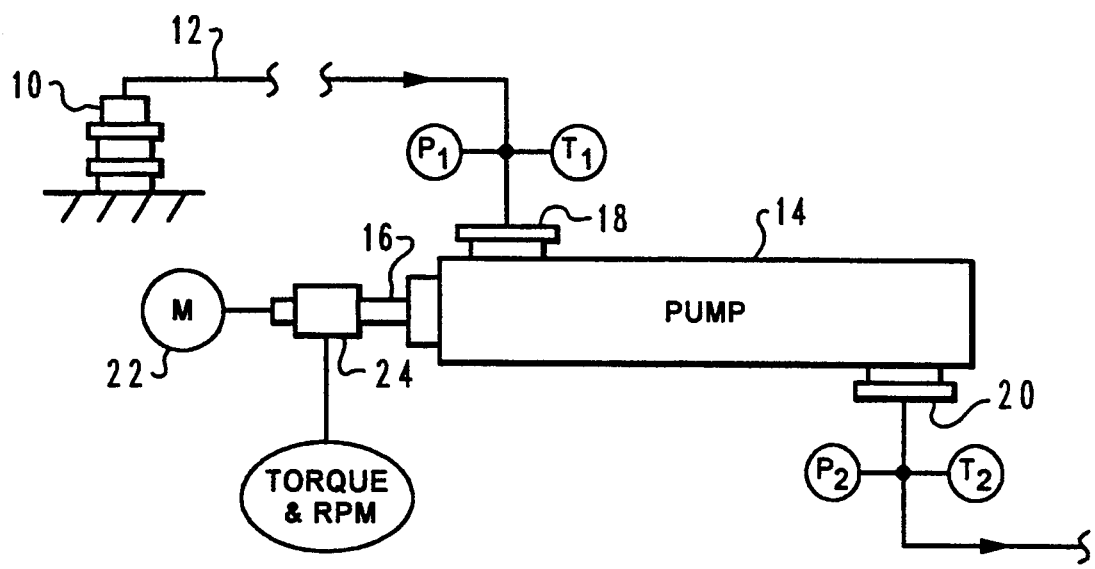

MULTIPHASE FLUID FLOW MEASUREMENT

BACKGROUND OF THE INVENTION

1. Field of the Invention

The present invention pertains to a method of measuring multiphase (liquid and gas) fluid flow based on pressure and temperature measurements taken across a pump which is pumping the multiphase fluid and based on the power input to the pump.

2. Background

My U.S. Pat. Nos. 4,852,395, issued Aug. 1, 1989, and 5,244,372, issued Jul. 6, 1993, both assigned to the assignee of the present invention, pertain to multiphase fluid flowmeters for measuring mixtures of gas, oil and water, for example, with a high degree of accuracy. In certain flowmeter applications, such as surface and subsea oil production wells and similar flow measuring requirements, the degree of accuracy required for the flow rates of the various fluid components is not as great as that provided for by the meters described in the above-mentioned patents. Moreover, in certain fluid flow measuring applications, such as remotely located and subsea oil production wells, the placement of a complex flowmeter in the production fluid flowline is difficult and expensive.

On the other hand, in many instances multiphase fluids require to be transferred by mechanical pumps, such as in crude oil production operations. The present invention provides an improved flow measurement method which utilizes measurements taken of multiphase fluid flow through a pump including power input to the pump. The method provides a suitable degree of accuracy which may be used as the primary fluid flow measurement technique in many fluid flow measuring applications.

SUMMARY OF THE INVENTION

The present invention provides an improved method of measuring multiphase fluid flow, such as the flow of gas and liquid, which may be a mixture of oil and water, from a fluid production well or other sources.

In accordance with an important aspect of the invention, a flow measurement method is provided wherein the multiphase fluid has its pressure and temperature increased by transfer through a pump and the volumetric flow rates of liquid and gas are determined by measuring pump power input together with the pressure and temperature of the multiphase fluid entering and leaving the pump. The flow measurement method relies on the thermodynamic relationships of measured parameters of the composition and flow rates of the multiphase mixture being pumped. Accordingly, approximate volumetric flow rates of a multiphase fluid may be obtained using equipment which may otherwise be required for handling the multiphase fluid mixture without the need for separate metering equipment.

Moreover, the system and method provide continuous, real time fluid flow measurement using uncomplicated flow measuring equipment and mathematical relationships which may be exercised using conventional computation apparatus.

Those skilled in the art will appreciate the advantages and superior features of the invention upon reading the detailed description which follows in conjunction with the drawing.

BRIEF DESCRIPTION OF THE DRAWING

The drawing is a schematic diagram of the equipment associated with the flow measuring method of the present invention.

DESCRIPTION OF A PREFERRED EMBODIMENT

In the description which follows, like parts are marked throughout the specification and drawing with the same reference numerals, respectively. The drawing FIGURE is not to scale and certain elements are shown in generalized or somewhat schematic form in the interest of clarity and conciseness.

The drawing illustrates an arrangement wherein a fluid production well 10 discharges a multiphase fluid flowstream through a conduit 12 which is connected to a suitable pump 14. The pump 14 may be a positive displacement type which is suited for handling multiphase fluids such as a progressive cavity type pump characterized by one or more somewhat helical lobed rotors which are operably connected to a rotary drive shaft 16. The pump 14 includes an inlet port 18 and a discharge port 20 at which, respectively, suitable pressure and temperature gauges are disposed for measuring the pressures and temperatures of the fluid flowstream entering and leaving the pump. The pump 14 is driven by a suitable motor 22 and a conventional torque meter and tachometer 24 may be interposed between the motor 22 and the drive shaft 16. Alternatively, the power input to the pump 14 may be measured by other means. An estimate of volumetric flow of liquid ($Q_L$), in cubic feet per second, and the gas volumetric flow rate ($Q_G$) in cubic feet per second may be made from the following set of equations:

$$Q_L = F_1/(1+F_2) \quad (1)$$

$$Q_G = (F_1)(F_2)/(1+F_2) \quad (2)$$

where $$F_1 = \left[ \frac{(H)(RPM)}{5252} - B \right] / [C(P_2 - P_1)] \quad (3)$$

$$F_2 = K \left( \frac{C_{pL}}{C_{pG}} \right) \left( \frac{d_L}{d_G} \right) \left[ \frac{T_2}{T_1} - 1 \right] / \left[ \left( \frac{P_2}{P_1} \right)^{n-1/n} - \left( \frac{T_2}{T_1} \right) \right] \quad (4)$$

where the measured parameters are H, which is the drive shaft torque measured by the torque meter 24 in foot pounds, RPM is the pump input shaft rotational speed measured at the torque meter 24 in revolutions per minute, and the pressures and temperatures are those indicated from the drawing in pounds per square inch absolute, and degrees Kelvin (460+°F.). Other parameters selected by the user of the method are pump calibration constants B, C and K. Also, certain parameters are predetermined based on known properties of the gas and liquid, including $c_{pL}$, the liquid specific heat in BTU/(LB-°F.), $c_{pG}$, the gas specific heat in BTU/(LB-°F.), n is the polytropic compression exponent for the gas in question, $d_L$ is the liquid density in pounds per cubic foot, and $d_G$ is the gas density at the pressure and temperature conditions, $P_1$ and $T_1$.

The multiphase fluid mixture enters the pump at the temperature and pressure conditions indicated above and on the drawing. If liquid were not present, adiabatic compression would heat the gas to a temperature $T_2*$ wherein:

$$T_2* = T_1(P_2/P_1)^{(n-1)/n} \quad (5)$$

The energy absorbed by the liquid cools the gas from temperature $T_2*$ to the temperature $T_2$ and heats the liquid in the mixture from $T_1$ to $T_2$. Accordingly, a heat balance equation expresses this relationship as follows:

$$(T_2* - T_2)c_{pG}Q_G d_G = K[(T_2 - T_1)c_{pL}Q_L d_L] \quad (6)$$

where $Q_G$ and $Q_L$ equal the gas and liquid flow rates indicated previously and $d_G$ and $d_L$ equal the gas and liquid densities, respectively, in pounds per cubic foot. The constant, K, is a value between 0.0 and 1.0 and accounts for the fact that heat transfer does not take place instantaneously.

A correlation for the input power (HP), in horse power, to the pump 14 has been developed which is stated as follows:

$$HP = (H)(RPM)(6.28/33000) = C(P_2 - P_1)(Q_L + Q_g) + B \quad (7)$$

wherein the coefficient C accounts for internal fluid leakage from the discharge side of the pump back toward the inlet side (which is related to the volumetric efficiency or the actual fluid displaced by the pump as a function of the ideal displacement or swept volume of the pump) and the coefficient B accounts for the power used to overcome pump mechanical and hydraulic friction. This correlation was established for data taken from operation of a helical screw rotor type pump of a type manufactured by Leistritz Aktiengesellschaft of Nuremberg, Germany as their Model L4H operating on a multiphase fluid mixture of methane gas and 24 API gravity crude oil wherein the gas-to-liquid ratios ranged from 0.9 to 0.99 in the tests. Accordingly, for a particular pump being used in a particular metering application, the constants K, C and B may be pre-established based on measured versus predicted fluid temperature changes $(T_2 - T_1)$ and input power to the pump for predetermined operating conditions, and would be valid for that pump for operations in the pressure and temperature ranges expected and operating on a fluid composition as expected.

Equations 1 through 4, indicated above, are obtained by solving the simultaneous equations (5) and (6) for the values of liquid flow rate, $Q_L$ and gas flow rate, $Q_G$.

Accordingly, continuous real time measurement of gas and liquid flow in a multiphase fluid mixture may be obtained using a pump as a flowmeter and measuring the parameters described above for use in calculating the values of liquid flow rate and gas flow rate provided for by equations (1) and (2). Moreover, the pump 14, for example, is advantageously utilized as a flowmeter as well as a pump while it is operating.

Although a preferred embodiment of a method in accordance with the invention has been described, those skilled in the art will recognize that various substitutions and modifications may be made to the method without departing from the scope and spirit of the invention as set forth in the appended claims.

What is claimed is:

1. A method for measuring the liquid flow rate and the gas flow rate of a multiphase fluid mixture flowing through a pump having an inlet port and a discharge port wherein the pressure and temperature of the fluid mixture undergo a change between said inlet port and said discharge port of said pump, respectively, said method comprising the steps of:

measuring the power input to said pump while pumping said fluid mixture;

measuring the pressures and temperatures of said fluid mixture entering and leaving said pump, respectively;

determining calibration constants of said pump comprising at least one of friction power absorbed by said pump while pumping said fluid mixture, and internal fluid leakage in said pump;

determining the specific heat and density of the fluids in said mixture, respectively; and determining the volumetric flow rate of the liquid in said fluid mixture based on the power input to said pump, the pressures and temperatures of the fluid mixture entering and leaving said pump, respectively, the specific heat and density of the gas and liquid in said fluid mixture, the polytropic compression exponent of said gas in said fluid mixture and at least one calibration constant of said pump which accounts for one of friction power loss in said pump, volumetric efficiency of said pump and the rate of heat transfer in said fluid mixture in said pump.

2. The method set forth in claim 1 wherein the liquid volumetric flow rate is determined from the equations:

$$Q_L = F_1/(1 + F_2)$$

$$F_1 = \left[ \frac{(H)(RPM)}{5252} - B \right]/[C(P_2 - P_1)]$$

$$F_2 = K\left(\frac{C_{pL}}{C_{pG}}\right)\left(\frac{d_L}{d_G}\right)\left[\frac{T_2}{T_1} - 1\right] / \left[\left(\frac{P_2}{P_1}\right)^{n-1/n} - \left(\frac{T_2}{T_1}\right)\right]$$

wherein H equals the driving torque exerted on an input shaft of said pump, RPM is the rotational speed of said input shaft, $P_1$ and $P_2$ are the inlet and outlet pressures of the fluid mixture flowing through said pump, $T_1$ and $T_2$ are the inlet and outlet temperatures of the fluid mixture flowing through said pump, B, C and K are pump calibration constants pertaining to friction power input to said pump, volumetric efficiency of said pump and the rate of heat transfer in said pump, respectively, $c_{pL}$ and $c_{pG}$ are the specific heats of the liquid and gas in the fluid mixture, respectively, n is the polytropic compression exponent, and $d_L$ and $d_G$ are the densities of the liquid and gas in the fluid mixture, respectively.

3. The method set forth in claim 2 wherein:
    the gas volumetric flow rate is determined from the equation:

$$Q_G = (F_1)(F_2)/(1 + F_2).$$

* * * * *